United States Patent [19]

Shibuya et al.

[11] 4,187,085
[45] Feb. 5, 1980

[54] TREATING FACILITY FOR SINTERING WASTE GAS

[75] Inventors: Teiji Shibuya, Yokohama; Yasuaki Ishikawa, Kawasaki; Masayuki Saito; Kiyoharu Ueda, both of Yokohama, all of Japan

[73] Assignee: Nippon Kokan Kabushiki Kaisha, Tokyo, Japan

[21] Appl. No.: 883,202

[22] Filed: Mar. 3, 1978

[30] Foreign Application Priority Data

Mar. 29, 1977 [JP] Japan .................................. 52/33969

[51] Int. Cl.² .......................... B03C 3/36; B01D 50/00
[52] U.S. Cl. ........................................ 55/4; 55/6;
55/9; 55/11; 55/23; 55/27; 55/80; 55/106;
55/125; 55/128; 55/135; 55/136; 55/213;
55/217; 55/268; 55/276; 55/473
[58] Field of Search .................... 55/4, 6, 11, 9, 18,
55/20, 21, 23, 27, 80, 97, 106, 125, 135, 213,
217, 268, 270, 310, 312–315, 342, 473, 128, 136,
276

[56] References Cited

U.S. PATENT DOCUMENTS

| | | | |
|---|---|---|---|
| 1,329,859 | 2/1920 | Schmidt et al. | 55/11 X |
| 2,729,301 | 1/1956 | Ekstrom, Jr. | 55/314 X |
| 2,741,330 | 4/1956 | Kaess | 55/213 X |
| 2,876,864 | 3/1959 | Dietrich | 55/6 |
| 3,377,058 | 4/1968 | Panzica | 55/312 X |
| 3,899,308 | 8/1975 | Petersson | 55/135 X |
| 4,078,390 | 3/1978 | Duvall | 55/20 X |

*Primary Examiner*—Kathleen J. Prunner
*Attorney, Agent, or Firm*—Frishauf, Holtz, Goodman & Woodward

[57] ABSTRACT

A treating facility for treating sintering waste gas comprises a first electric dust collector receiving the waste gas and a main blower connected to the first dust collector for moving the waste gas through the first dust collector. A heat exchanger is coupled to receive the waste gas from the blower. A waste gas purifying device is coupled to the heat exchanger for purifying the waste gas discharged from the first dust collector. A second wet electric dust collector is coupled to receive the waste gas from the purifying device and a pressure riser is coupled to the second dust collector for raising the pressure of the output gas of the second dust collector. The output gas from the pressure riser is returned to the heat exchanger and after heat exchange with the gas discharged from the blower is exhausted to atmosphere. A pressure adjusting valve coupled to the exhaust or output side of the main blower, is ordinarily closed but opens to exhaust the gas to atmosphere when an abnormal temperature or pressure exists downstream of the blower.

21 Claims, 1 Drawing Figure

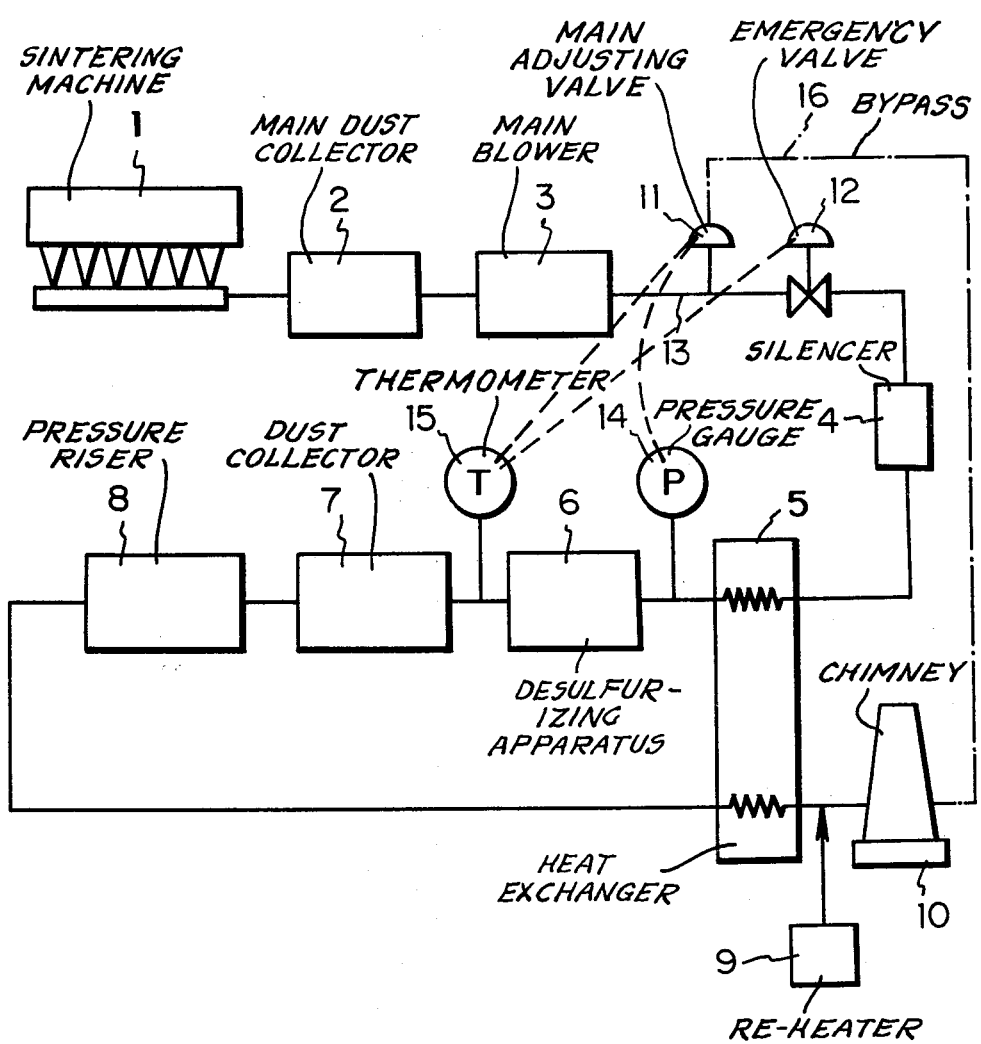

TREATING FACILITY FOR SINTERING WASTE GAS

BRIEF DESCRIPTION OF THE INVENTION

The invention relates to an improvement of a purifying facility for waste gas exhausted from a sintering machine.

The sintering process is broadly employed as one of the pre-treatments of ores. This process burns raw materials in the sintering machine. Wind boxes of the sintering machine are connected to a main duct and the air is sucked from the wind boxes by a main blower provided on the main duct. In general, this sucked air which is to be exhausted through the main duct bears much dust which is removed by an electric dust collector installed before the main blower. However, recently, demands for regulation of air pollution have been raised also as to $NO_x$ and $SO_x$ contained in the waste gas. Therefore, it has been necessary to provide a desulfurizing means or a means for removing nitrogen oxide in a subsequent line after the main blower for purifying the total amount of the waste gas. There have been hitherto several developments concerning the treatment of the sintering waste gas. Due to such efforts, appropriate countermeasures to reduce the air pollution have been practised, but there still remain some apprehensions regarding the safety of the facility.

For example, in case the pressure loss of the waste gas suddenly drops by any cause in the sucking side of the main blower, an opposite exhausting side is effected with considerably high pressure. If this pressure exceeds the designed pressure resistability of the purifying means and the other incidental facilities of the desulfurizing means arranged in the subsequent line, there is a possibility of breakage.

Further, in a system provided with a pressure riser, if the pressure loss of the waste gas suddenly drops by any cause in the suction side of the pressure riser, the purifying device and other incidental facilities are effected with considerably high negative pressure, and they will be possibly broken. Such accidents also happen due to an unbalance of opening angles of the respective suction dampers at the beginnings of the main blower and the pressure riser.

The above refers to one example involved in the breakage of the facilities by abnormal pressure. Such danger is also apprehended in that the waste gas of abnormally high temperature flows into the above said facilities. That is, the desulfurizing means is prepared at its interior with a reinforcing plastic lining on an inner surface of the steel plate of SS grade (plain carbon steel—Japanese Industrial Standard designation). Therefore, for example, if a cooling liquid pump for circulating the absorbed liquid of the desulfurizing means stops, the high temperature waste gas from the main blower is fed into the desulfurizing instrument and other subsequent apparatus, and the said lining material is damaged, resulting in breaking the installed machinery. Such dangers probably happen at stoppage of the electric current supplied to the facilities. In such a case, the cooling liquid pump instantly stops, but the main blower rotates continuously due to its inertia, and therefore the high temperature waste gas is directly sent into the desulfurizing apparatus from the main blower to create the same danger as discussed above.

This invention has been proposed to obviate such dangers. An object of this invention is to provide a system which prevents breakage of the facilities for purifying the waste gas or other machinery by the abnormal pressure of the sintering waste gas.

Another object of the invention is to provide a system which prevents flowing of the sintering waste gas of abnormally high temperature into the purifying facility and the other machinery.

A further object of the invention is to prevent breakage of the facilities by abnormal pressure and temperature and for improving the safety of operation thereof.

BRIEF DESCRIPTION OF THE DRAWING

The single FIGURE illustrates a facility for purifying sintering waste gas according to the invention.

DETAILED DESCRIPTION OF THE INVENTION

First the facility for treating sintering waste gas according to the invention will be outlined. Referring to the FIGURE, the facility comprises a sintering machine 1. A main electric dust collector 2, a main blower 3, and a main duct 13. The air, i.e. the sintering waste gas in the sintering machine 1, is fed by suction into the main electric dust collector 2 by the main blower 3 via the main duct 13 for removing the dust. The waste gas from the blower 3 is sent subsequently into a metallic rotary heat exchanger 5. It is recommended to arrange a silencer 4 before the heat exchanger 5 for reducing the noise.

The metallic rotary heat exchanger 5 is known as Jungstrome heat exchanger. For example, the high temperature gas is blown into a semi-circular side of the metallic rotary element, and the low temperature gas is blown into another half side thereof for providing the heat exchanging. Therefore, when the heat exchanger 5 is applied to the present invention, the semi-circular side of the metallic element is blown with the high temperature waste gas sent from the main blower 3, and another half side thereof is blown with the low temperature waste gas which has finished being purified as mentioned later.

In the invention, a wet desulfulizing apparatus 6 follows the heat exchanger 5 wherein the sintering waste gas is desulfurized. The actual structure of the wet desulfurizing apparatus 6 needs not to be especially discussed, and a conventional one can be used. The wet desulfurizing apparatus 6 may be substituted with another type of desulfurizing apparatus, a denitrifying apparatus or other purifying device.

The waste gas from the wet desulfurizing apparatus 6 contains mist of ammonium sulfate, ammonium sulfite, salts and others, and therefore in the invention the wet desulfurizing apparatus 6 is followed by a wet electric dust collector 7 to remove the mist. A pressure riser 8 is positioned after the wet electric dust collector 7 in order to overcome the pressure loss of the heat exchanger 5, the desulfurizing device 6 and the wet electric dust collector 7. The pressure of the waste gas is increased by the pressure riser 8 to again feed the purified waste gas into the heat exchanger 5. The heat exchanging is provided between the high temperature waste gas from the main blower 3 and the low temperature desulfurized waste gas and said low temperature waste gas is heated up to the desired temperature for exhausting it from a chimney 10 to the atmosphere. The temperature of the waste gas to be exhausted from the chimney 10 should be in general heated to about 120° C.

in view of the air pollution. Therefore, if the waste gas does not reach at this temperature, it should be heated by a re-heater 9 positioned before the chimney 10. The heat exchanger 5, purifying device 6, second dust collector 7, pressure riser 8 and exhaust device (chimney 10) together define a waste gas purifying line or stage.

A first characteristic of the invention is to provide a pressure adjusting valve 11 on the duct 13 at the exhaust side of the main blower 3. This valve 11 is ordinarily closed during operation. Now it is assumed that the pressure loss of the sintering waste gas at the suction side of the main blower 3 suddenly drops by any cause to create a pressure exceeding the designed pressure resistibility of the facilities after the main blower 3. In such a case the pressure adjusting valve 11 is opened and concurrently the inlet dampers of the main blower 3 and the pressure riser 8 are closed in order to partially exhaust the waste gas from the sintering machine 1 downstream of the main blower 3 to the atmosphere directly, otherwise to lead it to the chimney 10 via a bypass duct 16.

In a process of starting the pressure riser 8 and increasing the opening angle of the damper, if the resistance before the main blower 3 is high, a negative pressure is created by the suction strength of the pressure riser 8 in the suction tower and in other parts of the desulfurizing apparatus 6, which negative pressure exceeds the designed pressure resistibility (e.g. ±750 mm Aq) of the apparatus. In this case, the pressure valve 11 is opened and concurrently if necessary the inlet dampers of the main blower 3 and the pressure riser 8 are closed, and the air is drawn off through the valve 11. For example, if the resistance at the head of the sintering machine increases and the negative pressure of the gas in the main duct exceeds a predetermined value (e.g. up to −2000 mm Aq), the pressure valve 11 is opened and concurrently the inlet dampers of the main blower 3 and the pressure riser 8 are closed for protecting the electric dust collector, the ducts and other parts. If the pressure is over the determined values of the main duct or the suction tower of the desulfurizing apparatus 6 though depending upon the above said means (e.g. the negative pressure of the main duct becomes −2200 mm Aq, or the pressure of the suction tower reaches up to ±900 mm Aq), then the main blower 3 and the pressure riser 8 are stopped to protect the whole of the system.

The abnormal pressure of the waste gas is measured, according to the invention, by means of a pressure gauge 14 installed near the heat exchanger 5. When the pressure gauge 14 detects an abnormal pressure, the pressure valve 11 is opened automatically or manually. As to the automatic operation thereof, for example, the designed pressure resistibility of the main duct 13, the wet desulfurizing device 6 and other parts are made objective values, and when the pressure of the waste gas reaches this value, the pressure valve 11 is opened, and if necessary the inlet dampers of the main blower 3 and the pressure riser 8 are closed. A concrete controlling system in this instance does not need any special instrumentation, and a conventional system may be used. Therefore, details thereof are omitted.

A second characteristic of the invention is to provide an emergency breaking valve 12 following the pressure valve 11 on the duct 13 at the exhausting side of the main blower 3. This emergency breaking valve 12 is always opened. Assuming a case where the heat exchanger 5 stops and the cooling liquid pump of the desulfurizing apparatus 6 stops, the high temperature waste gas is directly fed into the machinery installed in the subsequent line. In order to prevent such a case, the main blower 3 and the pressure riser 8 are stopped and concurrently the emergency breaking valve 12 is closed to interrupt flowing of the high temperature waste gas into the following instruments, and concurrently the pressure valve 11 is opened to exhaust the gas to the atmosphere therefrom or from the chimney 10 through the bypass duct 16.

The abnormal temperature is measured by a thermometer 15 provided near the desulfurizing apparatus 6. When the thermometer 15 detects an abnormal temperature above a predetermined temperature (e.g. the temperature at the cooling parts of the desulfurizing apparatus rises to 70° C.), the pressure valve 11 and the emergency breaking valve 12 are operated automatically or manually. As to the automatic operation thereof, the heat resistance temperatures of the desulfurizing device 6 and the electric dust collector 7 are set for the objective value, and if the temperature of the waste gas reaches up to this objective value, the valve 11 is opened and the valve 12 is closed automatically or manually. A system for this does not need any special instrumentation, and a conventional system may be used.

It should be noted that the drawing shows the pressure gauge 14 positioned after the heat exchanger 5 and the thermometer 15 positioned after the wet desulfurizing device 6, but the present invention is not limited by these shown positions. The devices 14, 15 may be placed before the heat exchanger 5. This latter alternate arrangement is not shown in the drawing.

From the above description, the usefulness of the pressure valve 11 and the emergency breaker 12 is apparent, by means of which breakage of the instruments due to abnormal pressure and temperature may be avoided and the safety of operation improved.

Even with an electric power stoppage over the whole system, the high temperature gas is prevented from flowing into the suction tower of the desulfurizing apparatus 6 by automatically opening the pressure valve 11 and automatically closing the emergency breaking valve 12.

We claim:

1. In a treating facility for purifying sintering waste gas comprising a first electric dust collector (2) receiving the sintering waste gas, and a main blower (3) coupled to said first dust collector for moving the waste gas through said first dust collector, said main blower having an exhaust, the improvement comprising:

a metallic rotary heat exchanger (5) having a first input coupled to receive the waste gas from said first dust collector (2) by means of said main blower and a first output for delivering said waste gas, said heat exchanger including a second input and a second output coupled to said second input;

a waste gas purifying device (6) having an input coupled to said first output of said heat exchanger for purifying said waste gas which was received by said heat exchanger from said first dust collector, said waste gas purifying device having an output;

a second wet electric dust collector (7) having an input coupled to the output of said purifying device for removing dust from the waste gas received from said purifying device, said second dust collector having an output;

a pressure riser (8) having an input coupled to the output of said second dust collector for raising the pressure of the output gas of said second dust collector, the pressure riser having an output for discharging the gas raised in pressure, the temperature of the output gas of said pressure riser being lower than the temperature of the gas fed to said first input of said heat exchanger;

means coupling the output gas of said pressure riser (8) to said second input of said heat exchanger (5), for heat exchanging between the gases fed to said first and second inputs of said heat exchanger;

means coupled to said second output of said heat exchanger for exhausting gas therefrom;

said heat exchanger, said waste gas purifying device, said second dust collector, said pressure riser and said exhausting means comprising a waste gas purifying line; and a pressure adjusting valve (11) coupled to the exhaust of said main blower, said pressure adjusting valve having an outlet for exhausting gas therefrom.

2. Treating facility as claimed in claim 1, further comprising a pressure gauge (14) coupled to said waste gas purifying line for detecting the pressure of the gas in said waste gas purifying line.

3. Treating facility as claimed in claim 2 wherein said pressure gauge (14) is coupled to said waste gas purifying line between said heat exchanger (5) and said waste gas purifying device (6).

4. Treating facility as claimed in claim 2, further comprising a thermometer (15) coupled to said waste gas purifying line for detecting the temperature of the gas in said waste gas purifying line.

5. Treating facility as claimed in claim 4, wherein said pressure adjusting valve (11) is coupled to said thermometer (15) and pressure gauge (14), and further comprising a bypass line (16) coupled to said waste gas purifying line and connected between said outlet of said pressure adjusting valve (11) and said exhausting means for exhausting the gas from said pressure adjusting valve to said exhausting means responsive to operation of said pressure adjusting valve by at least one of said pressure gauge (14) and said thermometer (15).

6. Treating facility as claimed in claim 5 wherein the exhaust of said main blower (3) is coupled to said first input of said heat exchanger, said treating facility further comprising an emergency breaker valve (12) coupled between said exhaust of said main blower (3) and said first input of said heat exchanger (5) for selectively breaking communication between the exhaust of said main blower and said heat exchanger.

7. Treating facility as claimed in claim 1, further comprising a thermometer (15) coupled to said waste gas purifying line for detecting the temperature of the gas in said waste gas purifying line.

8. Treating facility as claimed in claim 7 wherein said thermometer (15) is coupled to said waste gas purifying line between said waste gas purifying device (6) and said second dust collector (7).

9. Treating facility as claimed in claim 1, comprising a re-heater (9) coupled between said second output of said heat exchanger and said exhausting means for further heating the gas which has been heated by said heat exchanger.

10. Treating facility as claimed in claim 9 wherein said exhausting means comprises a chimney (10) for receiving and exhausting the gas received from said re-heater.

11. Treating facility as claimed in claim 1 comprising a silencer means (4) coupled between said first dust collector and said heat exchanger.

12. Treating facility as claimed in claim 1 wherein the exhaust of said main blower (3) is coupled to said first input of said heat exchanger, said treating facility further comprising an emergency breaker valve (12) coupled between said exhaust of said main blower (3) and said first input of said heat exchanger (5) for selectively breaking communication between the exhaust of said main blower and said heat exchanger.

13. Treating facility as claimed in claim 12 wherein said breaker valve (12) is coupled between said pressure adjusting valve (11) and said heat exchanger.

14. A method for purifying sintering waste gas comprising removing dust from the sintering waste gas in a first electric dust collector, and moving said waste gas through said first dust collector by a main blower having an exhaust, the improvement comprising:

feeding the waste gas from said first dust collector to a metallic rotary heat exchanger and then feeding the waste gas out of the heat exchanger;

at least partially purifying the output waste gas from said heat exchanger to produce at least partially purified waste gas;

removing dust from said at least partially purified waste gas in a second wet electric dust collector to produce purified waste gas;

raising the pressure of said purified waste gas;

feeding the purified waste gas which had its pressure raised in said pressure raising step to said heat exchanger to effect a heat exchange with said waste gas received by said heat exchanger from said first dust collector;

exhausting the heat exchanged purified waste gas from said heat exchanger;

said steps of heat exchanging, purifying, second dust collecting, pressure raising and exhausting comprising a waste gas purifying stage; and adjusting the pressure of the waste gas at the exhaust of said main blower by a pressure adjusting valve and selectively releasing gas from said waste gas purifying stage via said pressure adjusting valve.

15. Method as claimed in claim 14, comprising detecting the pressure of the gas in said gas purifying stage.

16. Method as claimed in claim 15, comprising detecting said pressure of said gas in said waste gas purifying stage after it leaves said heat exchanger and before said purifying step.

17. Method as claimed in claim 15, further comprising detecting the temperature of the gas in said gas purifying stage.

18. Method as claimed in claim 17, wherein said pressure adjusting valve selectively releases gas responsive to at least one of the pressure and temperature in said waste gas purifying stage.

19. Method as claimed in claim 17 comprising selectively breaking communication between said first dust collector and said heat exchanger responsive to at least one of the temperature and pressure in said waste gas purifying stage.

20. Method as claimed in claim 14, comprising detecting the temperature of the gas in said gas purifying stage.

21. Method as claimed in claim 20, comprising detecting said temperature of said gas in said waste gas purifying stage before it is subjected to said second dust collecting step.

* * * * *